United States Patent Office 2,851,553
Patented Sept. 9, 1958

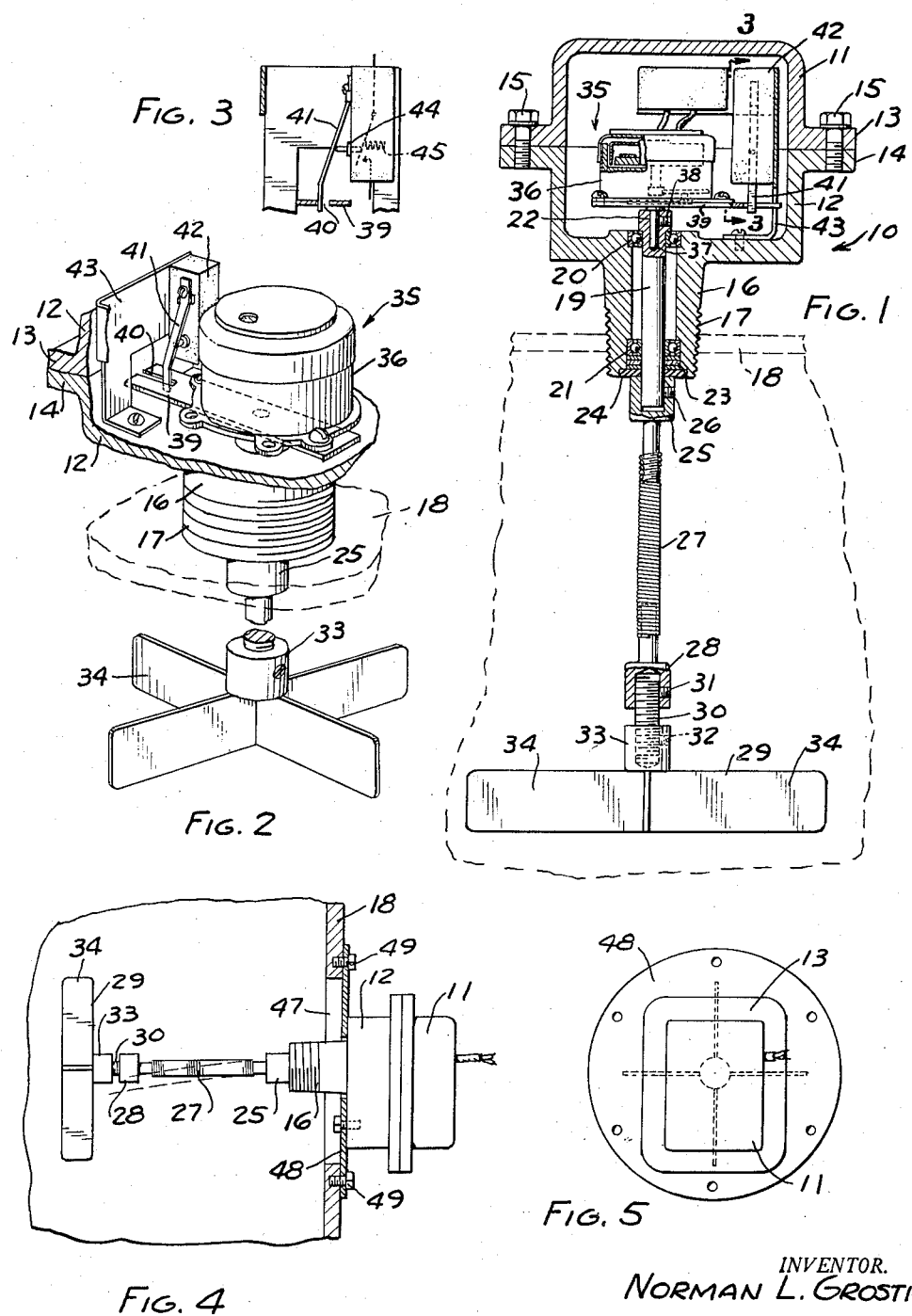

2,851,553

BIN LEVEL INDICATOR

Norman L. Grostick, Lexington, Mich., assignor to The Bin-Dicator Company, Detroit, Mich., a corporation of Michigan Application July 29, 1955, Serial No. 525,106

16 Claims. (Cl. 200—61.21)

This invention relates to level indicators and particularly to level indicators which are used in conjunction with bins containing pulverulent materials.

Such indicators may be used to actuate various devices such as a recording mechanism, a signal system, or a mechanism for controlling the feed of the materials to the bin.

In the handling of pulverulent materials a major consideration is the danger of explosion or fire which might be caused from a spark. Accordingly, a satisfactory level indicator that is electrically actuated should preferably not contain any mechanism which might produce a spark. In addition, the level indicator should not be adversely affected by dust or corrosion. It is also desirable that the level indicator be energized continuously and not intermittently. Another requirement of a satisfactory level indicator is that it be adapted for mounting vertically, horizontally or at intermediate angles.

It is therefore an object of this invention to provide a bin level indicator in which the formation of a spark is substantially prevented.

Another object of the invention is to provide a bin level indicator which is not adversely affected by dust or corrosion.

Another object of the invention is to provide a bin level indicator which is continuously energized and need not be deenergized when the level of the pulverulent materials rises to a predetermined point.

Another object of the invention is to provide a bin level indicator which may be mounted horizontally, vertically or at intermediate angles.

Basically, the bin level indicator of this invention comprises a housing from one side of which a shaft projects. The shaft is rotatably mounted in the housing by axially spaced bearings thereby utilizing the cantilever principle. A paddle is mounted on the end of the shaft through a flexible coupling. The output shaft of a hysteresis type motor is connected to the shaft which is mounted in the housing and the motor itself is supported on the shaft. An arm projects radially outwardly from and is mounted on the casing of the motor into position adjacent a microswitch. The spring of the microswitch tends to oppose movement of the radial arm in one direction. When electrical current is supplied to the hysteresis type motor, the shaft and, in turn, the paddle are rotated at a slow speed, rotation of the motor casing being prevented by contact of the radial arm with the microswitch. When the level of the pulverulent material in the bin rises to the level of the paddle, rotation of the paddle is arrested and, in turn, rotation of the shaft and rotor of the motor is arrested. As a result, the stator and casing of the motor tend to rotate about the rotor, causing the radial arm to overcome the action of the spring of the microswitch and thereby actuating the microswitch. The microswitch, in turn, may control various devices such as a recording mechanism, a signal device or the material feeding mechanism.

In the drawings:

Fig. 1 is a part sectional elevational view of the bin level indicator.

Fig. 2 is a fragmentary perspective view of the bin level indicator.

Fig. 3 is a sectional view taken along the line 3—3 in Fig. 1.

Fig. 4 is a part sectional view showing the bin level indicator mounted in horizontal position, and showing a modified means for mounting the indicator in the side of a bin.

Fig. 5 is a plan view of the modified means for mounting the level indicator shown in Fig. 4.

Referring to Figs. 1 and 2, the bin level indicator 10 comprises a housing which consists of an upper half 11 and a lower half 12 adapted to be brought into dust-tight relationship by means of flanges 13 and 14, respectively, and maintained in such relationship by bolts 15 passing through the flanges. The lower half 12 of the housing includes a tubular extension 16 which may be formed with threads 17 on the exterior surface thereof, whereby the housing may be mounted in the top or side wall of a bin 18 by threading the tubular extension 16 into a threaded opening in the wall of the bin. A shaft 19 is rotatably mounted in the opening of the tubular projection 16 by means of bearings 20, 21 which are spaced axially from each other thereby using the cantilever principle. The upper end 22 of the shaft 19 is of greater diameter and thereby rests against the bearing 20 and limits the movement of the shaft 19 downwardly through the tubular projection 16. A dust seal 23 is mounted below the bearing 21 and a retainer washer 24 is mounted below the dust seal. A female type coupling 25 is connected to the lower end of the shaft 19 by a set screw 26. A flexible shaft 27 is mounted on the lower end of the coupling 25 and a second coupling 28 is mounted on the end of the flexible shaft 27.

The flexible shaft 27 preferably is made from a tightly wound helical wire and is such that when bent out of alignment with the axis of the shaft 19 and released will return into alignment with the axis. The term "flexible shaft" as used herein is intended to cover any means which will operate in this manner. Finally, a paddle 29 having a coupling 33 is connected to the end of the flexible coupling by means of a nipple 30 and set screws 31, 32. The nipple 30 may be of various lengths thereby permitting the overall distance of the paddle from the housing to be changed to adapt the bin level indicator for measuring various levels in the bin.

Coupling 33 is preferably formed with standard pipe threads, as is the coupling 28. It is therefore possible to change the effective length of the bin level indicator by utilizing standard pieces of pipe having standard threads. The blades 34 of the paddle 29 are of such size that when the level of the pulverulent materials rises to the point where the paddle blades contact the material, the rotation of the paddle will be arrested.

The shaft 19 and, in turn, the paddle 29 are rotated by means of a motor 35. The motor 35 is of the hysteresis type, that is, it does not contain brushes or any other elements which tend to cause sparking. Such motors are described, for example, in the patent to Hansen et al. 2,237,961, issued April 8, 1941. The hysteresis type motor 35 includes a casing 36 in which the rotor and stator of the motor are positioned and may also include a gear reduction mechanism. The motor 35 is connected to the shaft 19 by means of the output shaft 37 of the motor which projects into a socket in the end of the shaft 19 and is held in fixed position relatively thereto by means of a set screw 38. The rotor of the motor thus is operatively connected with the shaft 19 while the casing 36, having the stator fixedly connected thereto, may rotate relative to the shaft 19. A plate 39 is mounted to the lower part of the casing 36 and projects radially outwardly therefrom to form a radial arm. The end of the radial arm 39 is slotted as at 40 and leaf spring 40 of a microswitch 42 projects into the slot (Figs. 2 and 3). The microswitch is held in fixed position relative to the lower half of the indicator housing 12 by means of a plate 43.

As shown in Fig. 3, the microswitch 42 is of standard construction and includes the leaf spring 41 which, when depressed, actuates the pin 44 to close the circuit which the microswitch controls. The microswitch also includes a light spring 45 which maintains the pin 44 in outward position. It should, of course, be understood that the microswitch may be of the type which breaks rather than makes a circuit.

In operation, when the circuit to the hysteresis type motor is completed the rotor of the motor rotates, causing the shaft 19 and, in turn, the paddle 29 to rotate at a low speed. Any tendency of the casing 36 of the hysteresis type motor to rotate is prevented by the leaf spring 41 contacting the slotted end of the radial arm 39. The tension of spring 41 is sufficient to prevent actuation of switch 42 under such conditions. When the level of the pulverulent materials rises to a point where the blades 34 strike the materials, the rotation of the paddle 29 is arrested; and, in turn, the rotation of the shaft 19 and the rotor of the hysteresis type motor 35 is arrested. The stator and casing 36 of the hysteresis motor then tend to rotate and the torque of radial arm 39 overcomes the tension of the leaf spring 41, closing the microswitch 42 and thus actuating the control or signal device. The microswitch 42 will remain closed as long as the pulverulent material remains at the level which prevents movement of the blades 34 of the paddle 29. The hysteresis type motor remains energized during this time. However, no damage will result to the hysteresis motor, even though it remains energized. When the level of the materials in the bin falls below the paddle 29, the paddle and, in turn, the shaft 19 and rotor will be free to rotate and will rotate, while the casing 36 will be returned and maintained to its original position by the action of the spring 41.

The bin level indicator may be mounted at any angle, for example, horizontally as shown in Fig. 4. The cantilever mounting of the shaft 19 by means of the spaced bearings 20, 21 prevents undue wear and permits the indicator to be mounted in the side or at any other angle without the need for any additional support for the end of the paddle. If the nipple 30 is extra long in length, the extra weight may cause the flexible shaft 27 to be bent as shown in the dotted lines in Fig. 4, but the operation of the bin level indicator will be the same and no damage will result to the indicator.

As shown in Figs. 4 and 5, the housing may be mounted in a large opening 47 in the top or side of the bin by utilizing a plate 48 which is fastened to the lower surface of the lower half 12 of the housing and projects outwardly from the tubular projection 16 to form a flange. The plate 48 may be mounted on the top or side of the bin by means of bolts 49.

It can thus be seen that I have provided a bin level indicator which may be used to actuate various types of mechanisms when the level of materials rises to a predetermined point. The mechanism of the bin level indicator and particularly the use of a hysteresis type motor effectively minimizes the possibility of producing sparks which may cause fires or explosions. The indicator is not adversely affected by dust or corrosion and it is not necessary to deenergize the motor when the rotation of the paddle is interrupted to a contact with the materials in the bin. The construction of the indicator permits its being mounted at any angle either in the top or side of the bin.

I claim:
1. An indicator for pulverulent materials and the like stored in a bin or the like comprising a shaft, means for rotatably supporting said shaft, means mounted on one end of said shaft and provided with a surface adapted to be contacted by the pulverulent materials, a continuously energized hysteresis motor having a casing, a rotor and a stator, said stator being fixedly connected to said casing, means providing a driving connection between said rotor and said other end of said shaft, means for mounting said motor casing for rotation relative to said supporting means for said shaft, the entire weight of said hysteresis motor being supported by said shaft, and a signal-actuating device positioned in fixed position relative to said supporting means for said shaft adjacent said casing and actuated by rotational movement of said casing relative to said shaft, and means for yieldingly urging said casing out of actuating position relative to said signal-actuating device, whereby when said hysteresis motor is continuously energized said shaft is rotated and when the level of the pulverulent material is such that the material contacts said means on the end of said shaft, the rotation of said shaft is arrested and said casing rotates relative to said shaft and said rotor in opposition to said yieldable means into actuating position relative to said signal-actuating device and said hysteresis motor continues to remain energized, and when the level of the pulverulent material drops, the shaft is again rotated and said yieldingly urging means returns said casing to its original position.

2. An indicator for pulverulent materials and the like stored in a bin or the like comprising a shaft, means for rotatably supporting said shaft, means mounted on one end of said shaft and provided with a surface adapted to be contacted by the pulverulent materials, a continuously energized hysteresis motor having a casing, a rotor and a stator, said stator being fixedly connected to said casing, means providing a driving connection between said rotor and said other end of said shaft, means for mounting said motor casing for rotation relative to said supporting means for said shaft, and a signal-actuating device positioned in fixed position relative to said supporting means for said shaft adjacent said casing and actuated by rotational movement of said casing relative to said shaft, and means for yieldingly urging said casing out of actuating position relative to said signal-actuating device, said signal-actuating device comprising a switch and said means for yieldingly urging said casing out of actuating position including a spring actuator forming a part of said switch, whereby when said hysteresis motor is continuously energized said shaft is rotated and when the level of the pulverulent material is such that the material contacts said means on the end of said shaft, the rotation of said shaft is arrested and said casing rotates relative to said shaft and said rotor in opposition to said yieldable means into actuating position relative to said signal-actuating device and said hysteresis motor continues to remain energized, and when the level of the pulverulent material drops, the shaft is again rotated and said yieldingly urging means returns said casing to its original position.

3. The combination set forth in claim 2 including an arm fixed to said casing and extending radially outwardly therefrom, said switch being mounted in the path of the outer end of said arm whereby said arm actuates said switch when the casing rotates relative to said shaft.

4. An indicator for pulverulent materials and the like stored in a bin or the like comprising a shaft, means for rotatably supporting said shaft, said shaft including an intermediate portion adjacent said means for supporting said shaft comprising a tightly wound helical coil spring, means mounted on one end of said shaft and provided with a surface adapted to be contacted by the pulverulent materials, a continuously energized hysteresis motor having a casing, a rotor and a stator, said stator being fixedly connected to said casing, means providing a driving connection between said rotor and said other end of said shaft, means for mounting said motor casing for rotation relative to said supporting means for said shaft, and a signal-actuating device positioned in fixed position relative to said supporting means for said shaft adjacent said casing and actuated by rotational movement of said casing relative to said shaft, and means for yieldingly urging said casing out of actuating position relative to said signal-actuating device, whereby when said hysteresis motor is continuously energized said shaft is rotated and when the level of the pulverulent material is such that the material contacts said means on the end of said shaft, the rotation of said shaft is arrested and said casing rotates relative to said shaft and said rotor in opposition to said yieldable means into actuating position relative to said signal-actuating device and said hysteresis motor continues to remain energized, and when the level of the pulverulent material drops, the shaft is again rotated and said yieldingly urging means returns said casing to its original position.

5. An indicator for pulverulent materials and the like stored in a bin or the like comprising a shaft, means for rotatably supporting said shaft, said means for rotatably supporting said shaft comprising axially spaced bearings thereby providing a cantilever support for said shaft, means mounted on one end of said shaft and provided with a surface adapted to be contacted by the pulverulent materials, a continuously energized hysteresis motor having a casing, a rotor and a stator, said stator being fixedly connected to said casing, means providing a driving connection between said rotor and said other end of said shaft, means for mounting said motor casing for rotation relative to said supporting means for said shaft, and a signal-actuating device positioned in fixed position relative to said supporting means for said shaft adjacent said casing and actuated by rotational movement of said casing relative to said shaft, and means for yieldingly urging said casing out of actuating position relative to said signal-actuating device, whereby when said hysteresis motor is continuously energized said shaft is rotated and when the level of the pulverulent material is such that the material contacts said means on the end of said shaft, the rotation of said shaft is arrested and said casing rotates relative to said shaft and said rotor in opposition to said yieldable means into actuating position relative to said signal-actuating device and said hysteresis motor continues to remain energized, and when the level of the pulverulent material drops, the shaft is again rotated and said yieldingly urging means returns said casing to its original position.

6. An indicator for pulverulent materials and the like stored in a bin or the like which comprises a housing, said housing having a tubular projection extending outwardly from one wall thereof, a shaft, bearings positioned in said tubular projection for rotatably mounting said shaft in such a position that it extends outwardly from the tubular projection, said bearings being spaced axially of the shaft, a dust seal mounted near the outer end of said tubular projection and surrounding said shaft, means mounted on the lower end of said shaft and provided with a surface adapted to be contacted by the pulverulent material, a hysteresis motor having a casing, a rotor and a stator positioned within said casing, said rotor being operatively connected with said shaft, said stator being fixedly connected to said casing, an arm mounted on said casing and projecting radially outwardly therefrom, a signal-actuating switch mounted in fixed position within said housing and operatively connected to said radial arm, said switch including a spring actuator acting on said radial arm and tending to oppose movement of said radial arm in a direction which would actuate said switch, whereby when said hysteresis motor is energized said shaft is rotated, and when the level of the pulverulent material is such that the material contacts said means on the end of said shaft, the rotation of said shaft is arrested and said casing rotates about the rotor and moves in opposition to said spring actuator to actuate said switch and the hysteresis motor remains continuously energized.

7. The combination set forth in claim 6 wherein said means for contacting the pulverulent material comprises a paddle having a multiplicity of blades.

8. The combination set forth in claim 6 wherein said shaft comprises a first rigid portion, a second rigid portion and flexible means supporting the second portion on said first portion with the axes of said portions in alignment, said flexible means having the property of tending to return said second shaft portion into alignment with the first shaft portion when said second shaft portion is deflected out of alignment.

9. The combination set forth in claim 8 wherein said flexible means comprises a tightly wound helical coil.

10. The combination set forth in claim 9 wherein said first portion of said shaft terminates adjacent the extremity of said tubular projection and said helical coil is positioned adjacent said tubular projection.

11. An indicator for pulverulent material and the like stored in a bin or the like which comprises a shaft, means for rotatably supporting said shaft, said shaft having one end thereof terminating adjacent said means for rotatably supporting said shaft, a second shaft, flexible means supporting said second shaft on said first shaft with the axes of said shafts in alignment, the area surrounding said flexible means being unrestricted to permit the second shaft to be deflected out of alignment with said first shaft, said flexible means having the property of tending to return said second shaft into alignment with said first shaft when said second shaft is deflected out of alignment, means mounted on said shaft and provided with a surface adapted to be contacted by the pulverulent material, a motor having a casing, a rotor and a stator mounted within said casing, said rotor being operatively connected with said shaft, said stator being fixedly connected with said casing, means for mounting said casing for rotational movement relative to said supporting means for said shaft, a switch mounted in fixed position relative to said supporting means for said shaft adjacent said casing and actuated by movement of said casing, a spring tending to oppose movement of said casing in a direction which would actuate said switch, whereby when said motor is energized said shaft is rotated and movement of said casing of the motor is opposed by said spring, and when the level of pulverulent material is such that the material contacts said means on the end of said shaft, the rotation of said shaft is arrested and said casing rotates about said rotor and moves in opposition to said spring to actuate said switch.

12. The combination set forth in claim 11 wherein said flexible means comprises a tightly wound helical coil.

13. An indicator for pulverulent material and the like stored in a bin or the like which comprises a shaft, means for rotatably supporting said shaft, means mounted on said shaft and provided with a surface adapted to be contacted by the pulverulent material, a motor having a casing, a rotor and a stator mounted within said casing, said rotor being operatively connected with said shaft, said stator being fixedly connected with said casing, means for mounting said casing on said shaft for rotational movement relative to said supporting means for said shaft, the entire weight of said casing being supported by said shaft, a switch mounted in fixed position relative to said supporting means for said shaft adjacent said casing and actuated by movement of said casing, a spring tending to oppose movement of said casing in a direction which would actuate said switch, whereby when said motor is energized said shaft is rotated and movement of said casing of the motor is opposed by said spring, and when the level of pulverulent material is such that the material contacts said means on the end of said shaft, the rotation of said shaft is arrested and said casing rotates about said rotor and moves in opposition to said spring to actuate said switch.

14. An indicator for pulverulent material and the like stored in a bin or the like which comprises a shaft, means including axially spaced bearings for providing a cantilever mounting for said shaft, means mounted on said shaft and provided with a surface adapted to be contacted by the pulverulent material, a motor having a casing, a rotor and a stator mounted within said casing, said rotor being operatively connected with said shaft, said stator being fixedly connected with said casing, means for mounting said casing on said shaft for rotational movement relative to said mounting means for said shaft, the entire weight of said casing being supported by said shaft, a switch mounted in fixed position relative to said mounting means for said shaft adjacent said casing and actuated by movement of said casing, a spring tending to oppose movement of said casing in a direction which would actuate said switch, whereby when said motor is energized said shaft is rotated and movement of said casing of the motor is opposed by said spring of said switch, and when the level of pulverulent material is such that the material contacts said means on the end of said shaft, the rotation of said shaft is arrested and said casing rotates about said rotor and moves in opposition to said spring to actuate said switch.

15. An indicator for pulverulent material and the like stored in a bin or the like comprising a shaft, means for rotatably supporting said shaft, means mounted on said shaft and provided with a surface adapted to be contacted by the pulverulent material, a motor having a casing, a rotor and a stator mounted within said casing, means for operatively connecting said rotor with said shaft, said stator being fixedly connected with said casing, an arm mounted on said casing and projecting radially outwardly therefrom, a signal-actuating device mounted in fixed position relative to said supporting means for said shaft adjacent said arm and actuated by movement of said arm relative to said shaft, and means for yieldingly urging said casing out of contacting position relative to said signal-actuating device, whereby when said motor is energized said shaft is rotated and when the level of the pulverulent material is such that the material contacts said means on the end of said shaft, the rotation of said shaft is arrested and said casing rotates relative to said shaft and said rotor in opposition to said yieldable means causing said radial arm to move into actuating position relative to said signal-actuating device.

16. An indicator for pulverulent material or the like stored in a bin or the like which comprises a shaft, means for rotatably supporting said shaft, means mounted on said shaft and provided with a surface adapted to be contacted by the pulverulent material, a motor having a casing, a rotor and a stator mounted within said casing, means for operatively connecting said rotor to said shaft, said stator being fixedly connected with said casing, a switch mounted in fixed position adjacent said casing and adapted to be actuated by movement of said casing, said switch including a spring tending to oppose movement of said casing in a direction which would actuate said switch, whereby when said motor is energized said shaft is rotated and movement of said casing of the motor is opposed by said spring of said switch and when the level of pulverulent material is such that the material contacts said means on the end of said shaft, the rotation of said shaft is arrested and said casing rotates about said rotor and moves in opposition to said spring in said switch to actuate said switch.

References Cited in the file of this patent

UNITED STATES PATENTS

| | | |
|---|---|---|
| 2,116,075 | Lenhart | May 3, 1938 |
| 2,698,362 | Bozich | Dec. 28, 1954 |